(12) United States Patent
McClure et al.

(10) Patent No.: US 8,181,435 B1
(45) Date of Patent: May 22, 2012

(54) PICK-UP TINE DIVIDERS

(75) Inventors: John R. McClure, New Holland, PA (US); Singh Chandrashekhar, Lancaster, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 13/296,536

(22) Filed: Nov. 15, 2011

(51) Int. Cl.
*A01D 43/02* (2006.01)
*A01D 89/00* (2006.01)

(52) U.S. Cl. .......................................... 56/364
(58) Field of Classification Search ............ 56/364, 56/132, 372, 341, DIG. 9; 100/100; 198/513, 198/512
See application file for complete search history.

(56) References Cited

U.S. PATENT DOCUMENTS

| | | | |
|---|---|---|---|
| 1,877,519 A | 9/1932 | MacGregor | |
| 2,527,887 A | 10/1950 | Martin | |
| 2,682,743 A * | 7/1954 | Hintz | 56/364 |
| 3,226,921 A | 1/1966 | Shepley | |
| 3,397,527 A * | 8/1968 | Luek et al. | 56/364 |
| 3,613,345 A | 10/1971 | Cofer | |
| 3,713,283 A | 1/1973 | Fritz | |
| 3,983,683 A | 10/1976 | James | |
| 4,161,859 A * | 7/1979 | Storm et al. | 56/364 |
| 4,297,833 A * | 11/1981 | Gaeddert | 56/364 |
| 4,524,576 A * | 6/1985 | Probst | 56/372 |
| 5,052,171 A * | 10/1991 | Bich et al. | 56/364 |
| 5,394,682 A * | 3/1995 | Frimml et al. | 56/341 |
| 5,426,928 A * | 6/1995 | Frimml et al. | 56/341 |
| 6,079,194 A * | 6/2000 | Waldrop | 56/364 |
| 6,314,708 B1 | 11/2001 | Engel | |
| 6,314,709 B1 * | 11/2001 | McClure et al. | 56/364 |
| 6,651,418 B1 * | 11/2003 | McClure et al. | 56/341 |
| 7,478,523 B2 | 1/2009 | McClure et al. | |
| 7,516,604 B2 * | 4/2009 | Josset | 56/364 |
| 2006/0242937 A1* | 11/2006 | Pourchet et al. | 56/219 |
| 2008/0000212 A1* | 1/2008 | Ubaldi | 56/364 |
| 2009/0320434 A1 | 12/2009 | Pourchet et al. | |

FOREIGN PATENT DOCUMENTS

DE 3315033 A1 10/1984
* cited by examiner

*Primary Examiner* — Arpad Fabian-Kovacs
(74) *Attorney, Agent, or Firm* — Patrick M. Sheldrake

(57) ABSTRACT

A tine divider plate for use on a pick-up assembly for an agricultural harvester that is connected to the tine guard and pick-up assembly frame structure using a combination of hooks and slots to retain the divider plate in position once installed. An additional hat section may be provided adjacent to the one end of each tine divider plate to direct bent tines through spaces in the tine guard upon reverse tine reel rotation.

14 Claims, 4 Drawing Sheets

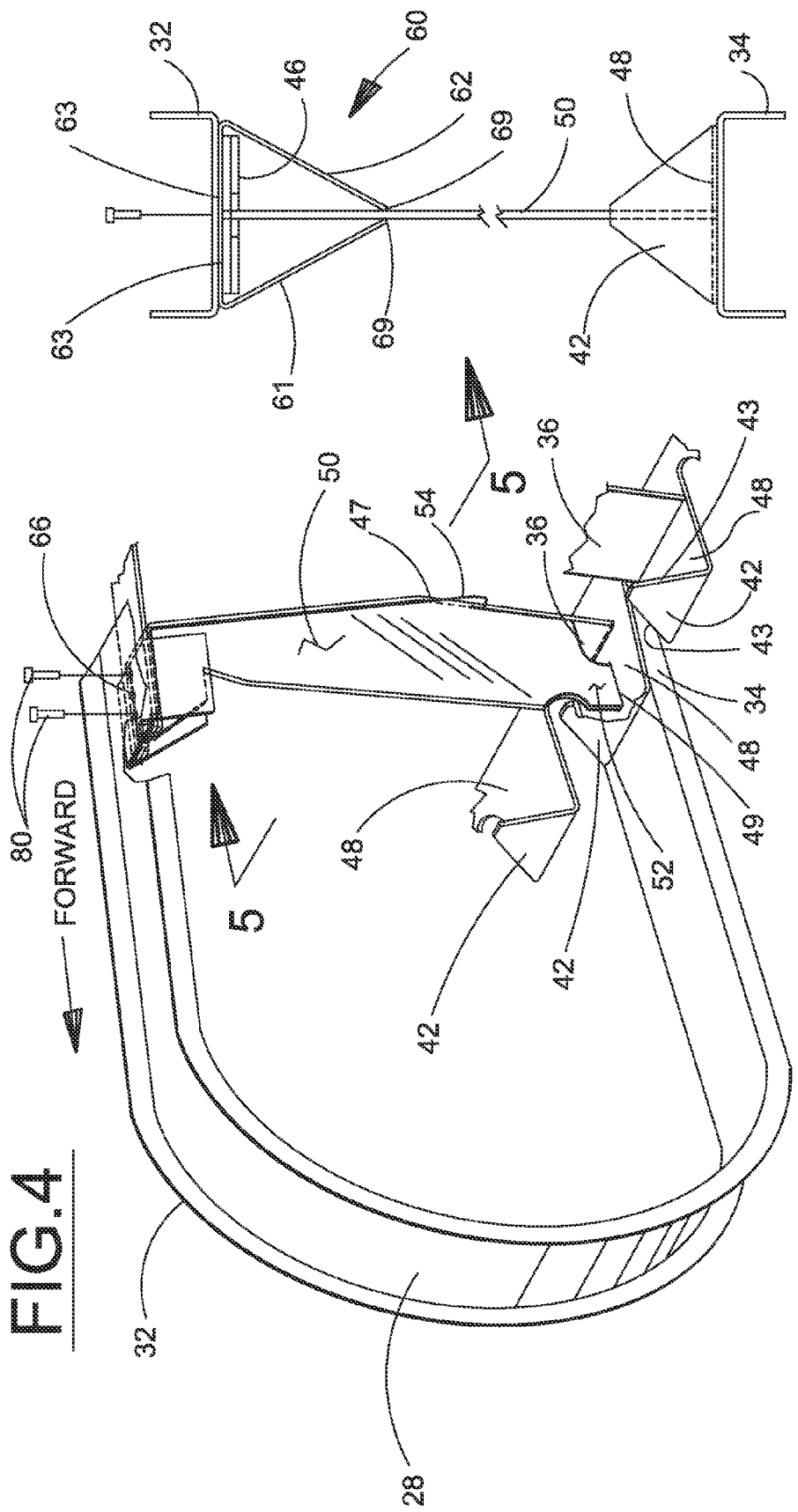

PICK-UP TINE DIVIDERS

BACKGROUND OF THE INVENTION

This invention relates generally to an agricultural pickup assembly having tines passing within tine guards and, more particularly, to a pickup tine guide having an improved mounting to the tine guards.

Pick-up assemblies used in agricultural harvesting machines typically include a reel that is rotatable about a horizontal central axis. The reel comprises a plurality of parallel tine bars arranged for movement in a generally circular path around the central axis. Individual tines are connected to the bars and extend generally radially outwardly to lift crop material from the ground and convey it into a crop processing mechanism. The tine bars are connected to a central shaft by end plates, and as the reel rotates, the tines project through spaces or gaps formed between tine guards arranged side-by-side transversely of the reel. These tine guards are individually secured at their top and bottom ends to support members on the pickup.

The tine bars may be individually rotated dependent upon the reel rotational position varying the position of the tines relative to the reel rotational position, such as for folding the tines inwardly at a upper position in the rotation to release the crop material for feed into the machine. Cams within the pick-up assembly rotate the tine bars to control the tine position. As the tine releases crop at the top of its rotational path, the tine is retracted to fold down between the tine reel and the frame. Tines ideally move in a plane that is generally perpendicular to the tine reel rotational centerline in order to pass cleanly through the spaces in the tine guards. Tines that are bent tend to protrude out of this plane and into the space for adjacent tines. As bent tines pass through the tine guard spaces, the tines contact the edges openings in the tine guards causing wear on the tines and tine guards, and making the tine more susceptible to further bending. Repeated flexing of tines to pass through the tine guard openings also accelerates tine breakage. Once retracted within the pick-up assembly, bent tines may encroach the space of adjacent tines and even overlap adjacent tines and at which point the tines are no longer functional for moving crop material.

Some pick-up assemblies include divider plates welded in place to separate the travel paths of the tines as they rotate through the pick-up assembly. The divider plates prevent tine overlap within the pick-up assembly and the resultant wear, but limit production flexibility since some customers prefer pick-up assemblies without divider plates installed.

It would be advantageous to provide a removable pick-up assembly tine divider plate that could be selectively installed on a common pick-up assembly thereby enabling divider plates to be offered as an optional feature on a common pick-up assembly. Additional advantages would be realized by a tine divider plate that is trapped in place by design to eliminate the need for additional fastening hardware to secure the divider plate to the pick-up assembly. Further advantages would be realized if the removable tine divider could be easily replaced when excessively worn by contact with bent tines. Still further advantages would be provided by a tine divider plate incorporating an additional wear surface to protect tine guards from wear caused by bent tines. By providing a replaceable additional wear surface to protect the tine guards, the useful life of the pick-up assembly can be increased by reducing wear on the tine guard structure itself.

SUMMARY OF THE INVENTION

Accordingly, the present invention, in any of the embodiments described herein, may provide one or more of the following advantages:

It is an object of the present invention to provide a tine divider plate for a pick-up reel that utilizes tabs and receptacles for securing the plates in position in lieu of a welded connection.

It is a further object of the present invention to provide a tine divider plate for a pick-up assembly that may be selectively installed, removed, or replaced by a user without tools.

It is a further object of the present invention to provide a tine divider for a pick-up assembly that is suitably robust for application in an agricultural pick-up reel.

It is a further object of the present invention to provide an additional guide for use in conjunction with a removable tine divider plate that provides an angled tine guide for directing a bent tine through a tine guard opening to reduce bending stresses on the tine and wear on the tine guard opening edges.

It is a still further object of the present invention to provide an additional guide for use in conjunction with a removable tine divider plate that provides an angled tine guide for directing a bent tine through a tine guard when the tine reel direction of rotation is reversed.

It is a still further object of the present invention to provide a selectively installable tine divider plate that is compatible with current production pick-up assemblies used in agricultural balers and other agricultural equipment having pick-up reels.

It is a still further object of the present invention to provide a selectively installable tine divider plate for use in a pick-up assembly that is durable in construction, inexpensive of manufacture, carefree of maintenance, easily assembled, and simple and effective to use.

These and other objects are achieved in accordance with the instant invention by providing a tine divider plate for use on a pick-up assembly for an agricultural machine that is connected to the tine guard and pick-up assembly frame structure using a combination of tabs, hooks, and slots to retain the divider plate in position once installed. An additional hat section may be provided adjacent to the one end of each tine divider plate to direct bent tines through spaces in the tine guard upon reverse tine reel rotation.

BRIEF DESCRIPTION OF THE DRAWINGS

The advantages of this invention will be apparent upon consideration of the following detailed disclosure of the invention, especially when taken in conjunction with the accompanying drawings wherein:

FIG. 4 is a partial perspective of a tine guard, mounting frame, and a second embodiment of the tine guide of the present invention incorporating an additional tine deflector; and FIG. 5 is a front elevation view of the tine guide shown in FIG. 4.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
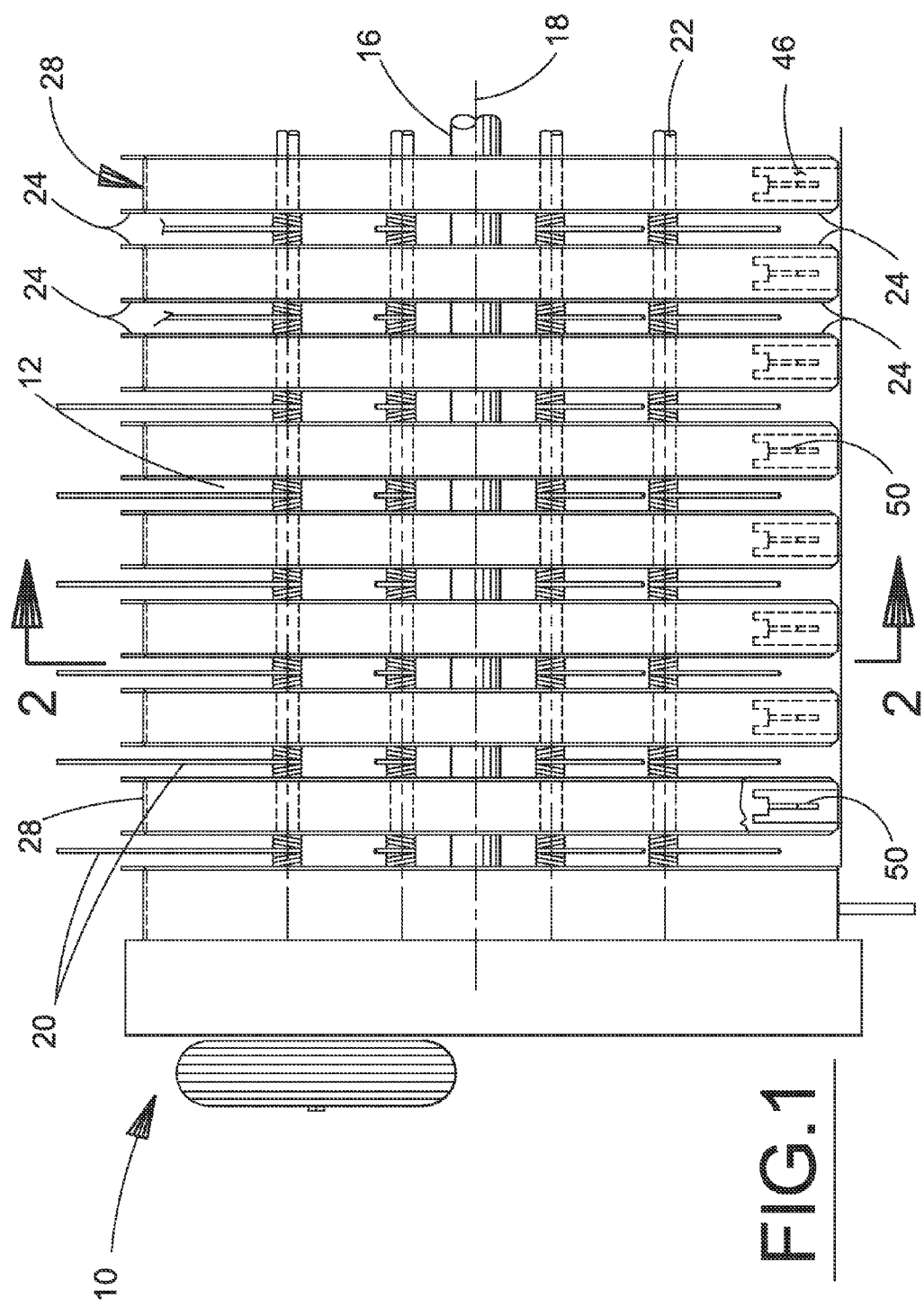
FIG. 1 is a partial plan view of a pick-up assembly used in an agricultural harvester of the type on which the present invention is useful.
Figure 2:
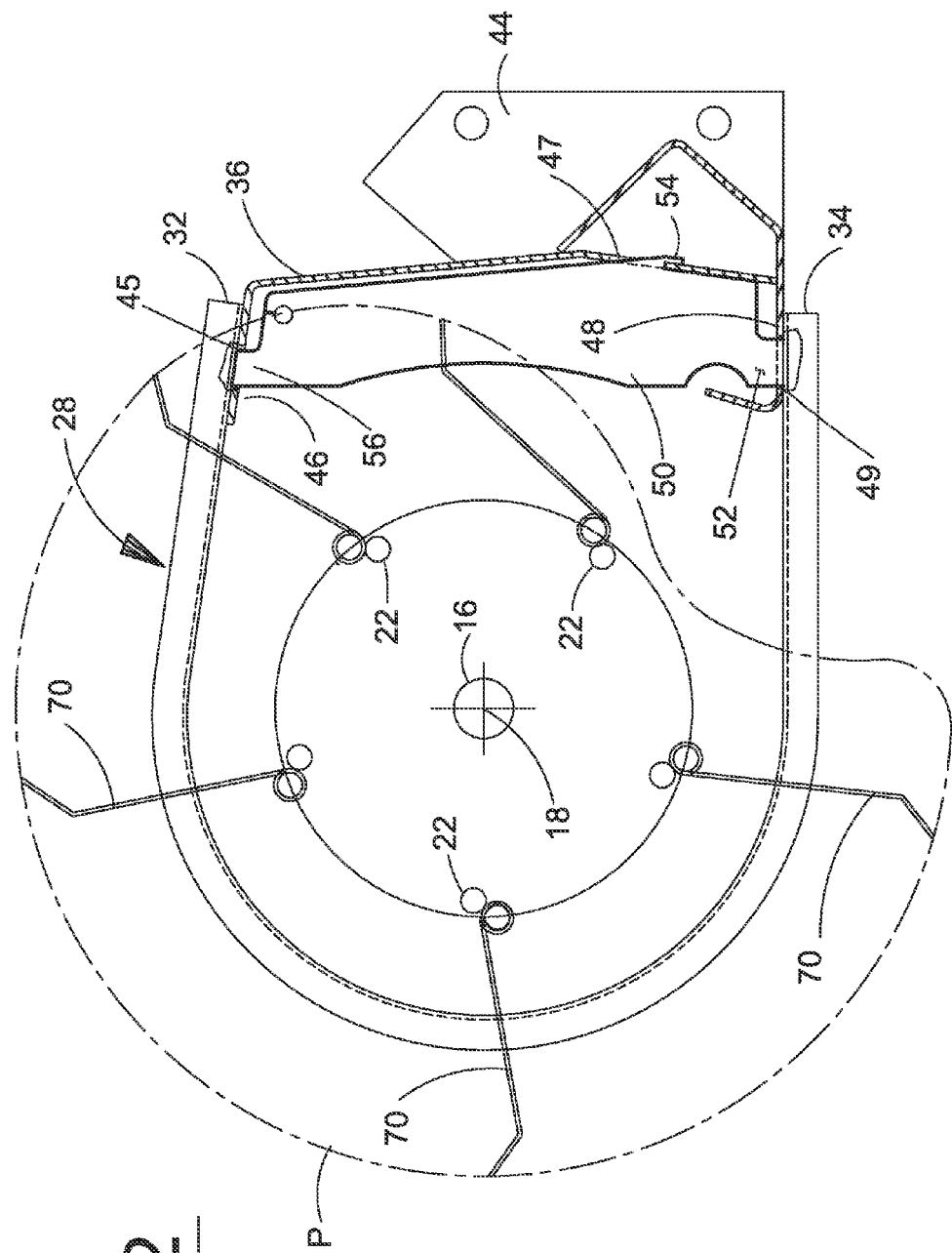
FIG. 2 is a section view of the pick-up assembly of FIG. 1 taken along cut line 2-2.

Referring to the figures, particularly FIGS. 1 and 2, a pick-up 10 for agricultural machines such as balers and forage harvesters includes a reel 12. The reel 12 has a central shaft 16 with a generally horizontal axis 18, and a plurality of tines 20 arranged in spaced apart rows along the length of the central shaft 16. The tines 20 are mounted on transverse bars 22 that extend between end plates (not shown) fixed to the shaft 16 adjacent the ends thereof. Conventional drive means such as chains and sprockets (not shown) are provided to rotate the central shaft 16 and thereby cause movement of the tines 20 in a predetermined path P, known in the art, in order to lift crop material from the ground.

As the tines 20 move along path P, they project through spaces or gaps 24 formed between adjacent tine guards 28 that are arranged side-by-side transversely across the reel 12. Tine guards 28 are substantially C-shaped, as seen in FIG. 2, in side elevation and generally channel-shaped in cross section with their upper and lower end portions 32, 34, respectively, attached to bracket 36 (FIG. 4) using conventional means such as by bolting. Bracket 36 is affixed, as by welding, to the pickup frame 44, and extends angularly from a generally flat upper portion 46 to a generally flat lower portion 48. Tine guards 28 are connected to the flat upper and lower portions 46, 48, respectively, such that the upper end 32 is generally above the lower end 34.

An elongate tine guide strip 50 is provided between flat upper portion 46 on one end, and flat lower portion 48 at the other end. Tine guide strip 50 includes an upper tab 56, a rear hook 54, and a lower tab 52 which are configured to engage receptacles in the bracket 36 to retain the tine guide strip 50 in position once installed. Lower tab 52 engages a lower receptacle 49 in the flat lower portion 48. Rear hook 54 engages rear aperture 47 in bracket 36. Rear hook 54 is configured to engage rear aperture 47 in a downward motion so that a portion of rear hook 54 extends below the rear aperture 47 and prevents forward movement of guide strip 50 away from bracket 36. The upper portion of tine guide strip 50 terminates in upper tab 56 which engages upper aperture 45 in bracket 36. Upper aperture is configured to allow installation of the guide strip 50 and the positioning of tabs 52 and 54 in apertures 47 and 49, respectively with tine guards 28 removed. Once upper tab 56 is engaged in upper aperture 45, installation of the tine guard 28 prevents the guide strip 50 from being removed, thus securing the guide strip in an operating position. The back edge of the tine guide 50 generally matches the general forward shape of bracket 36 and a slight interference fit exists between the tine guide 50 and the spacing between opening of the upper and lower flat portions 46, 48 so that the tine guide 50, once inserted, is held in the position shown in FIGS. 2 and 3 in a generally rigid manner.

This particular tine guide strip mounting arrangement has manufacturing cost advantages in that it requires no fasteners (e.g., bolts) to eliminates bolts required to fasten the guide strip in place and does not require welding. Furthermore, mounting provisions for the tine guide strip of the present invention (i.e. apertures 45, 47, 49) may be easily incorporated on all pick-up assemblies regardless of whether tine guide strips are to be installed thereby further improving manufacturing efficiency.

Figure 3:
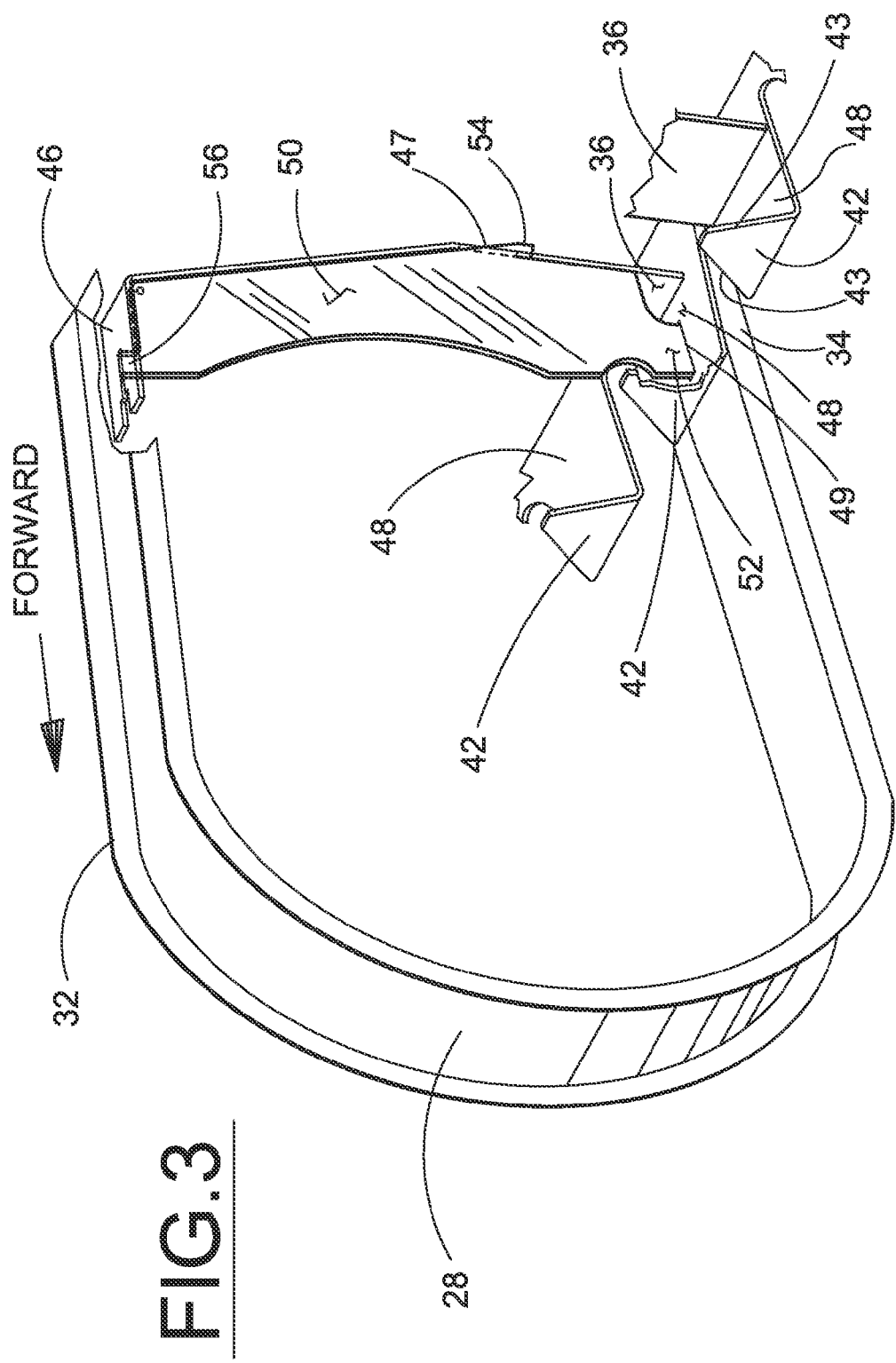
FIG. 3 is a partial perspective of a tine guard, mounting frame, and one embodiment of the tine guide of the present invention.

Referring to FIGS. 3 and 4, the lower flat portion 48 terminates in a upturned tine deflector 42 having side edges 43 which are angled from vertical. The side edges are positioned to contact any bent tines as the tines move downwardly and guide them toward the opening space 24 between the tine guards 28. Guiding bents tines toward the open spaces 24 reduces the risk that a tine will be trapped by interior structures and broken from the tine reel. A corresponding side edge structure adjacent to the upper opening in the tine guard is not normally provided since it would only guide bent tines through the open space 24 when the tine reel was operated in a reverse direction. It is desirable in some instances to enable reverse rotation of the tine reel. A top hat structure 60 may be provided in conjunction with the tine guide strip of the present invention. The top hat structure comprises a pair of opposing guide surfaces 61, 62 that are angled relative to vertical and positioned to guide a bent tine toward the open space 24 as the tine reel rotates in a reverse direction from normal. The top hat structure may be fabricated in two mirror-image pieces, one for the one side of the tine guide and the other for the opposite side. Alternatively, a single structure connecting the opposing guide surfaces 61, 62 may be provided. The structure 60 is preferably clamped into position by positioning a clamp surface 63 between the upper flat portion 46 and the upper end portion 32 of the tine guard using the same fastening provisions that secure the tine guard to the upper flat portion 46 of the bracket 36. By utilizing existing fastening provisions, the need to provide additional hardware on the pick-up assembly is eliminated. Openings 66, whether semi-circular cutouts in a two-piece top hat structure or a slotted opening in a single-piece structure allow the structure to be positioned fore-aft in relation to the tine guard upper clamp bolts 80.

Naturally, the invention is not limited to the foregoing embodiments, but it can also be modified in many ways without departing from the basic concepts. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. An improved windrow pick-up attachment for an agricultural harvesting machine, the pick-up attachment having a forward end and a generally opposing rearward end, the attachment comprising:
    a frame mountable on the front of the harvesting machine,
    a transverse reel assembly mounted on said pick-up frame for engaging and picking up crop material from the ground, said reel assembly including a series of tines and a plurality of generally C-shaped, spaced-apart side-by-side tine guards, the opening of each C-shaped tine guard facing rearwardly, respective upper and lower ends thereof configured for connection to generally flat upper and lower end portions on said pick-up frame, the tines projecting outwardly between said tine guards for engaging the crop material and urging it upwardly and rearwardly along outer surfaces of said tine guards;

a plurality of generally planar tine guides each having a top end, a generally opposing bottom end, and a rearward-facing edge therebetween, said top end having an upper hook, said bottom end having a lower hook, and said rearward-facing edge having a rear hook; and an upper receptacle on said upper end portion, a lower receptacle on said lower end portion, and a rear receptacle on the pick-up frame, the geometry and relative positioning of said upper, lower, and rear hooks and said upper, lower, and rear receptacles, respectively, being such that at least a portion of each hook engages its respective receptacle to hold each said tine guide in place between said upper and said lower flat portions.

2. The device of claim 1, wherein each said plurality of tine guides is positioned to extend generally between the upper and lower ends of a respective tine guard.

3. The device of claim 2, wherein said plurality of tine guides may be selectively installed or removed from the pick-up attachment.

4. The device of claim 3, wherein said plurality of tine guides are held in place by the engagement of said upper, lower, and rear hooks with said upper, lower, and rear receptacles, respectively without additional fasteners or connectors.

5. The device of claim 4, further comprising a deflector mounted adjacent said top end of each tine guide, said deflector having a first angled surface disposed adjacent to a first side of said tine guide and a second angled surface disposed adjacent to an opposing second side of said tine guide, each angled surface being angled relative to said tine guide and contacting respective sides of said tine guides below and spaced apart from said top end.

6. The device of claim 5, wherein said deflector further comprises a mount configured to be disposed between said flat upper portion and said upper end of said tine guard, connection of said tine guard upper end to said flat upper portion clamping said mount therebetween and retaining said deflector in position.

7. The device of claim 6, wherein said deflector comprises two generally symmetric portions, each portion having one of said angled surfaces and a portion of said mount to permit said deflector mount portions to be inserted between said flat upper portion and said upper end of said tine guard from each side of said tine guide.

8. In a windrow pick-up attachment for an agricultural harvesting machine, the pick-up attachment having a forward end, a rearward end, and a frame mountable on the front of the harvesting machine, a transverse reel assembly mounted on the pick-up frame for engaging and picking up crop material from the ground, the reel assembly including a series of tines and a plurality of generally C-shaped, spaced-apart side-by-side tine guards, the opening of each C-shaped tine guard facing rearwardly, respective ends thereof configured for connection to generally flat upper and lower end portions on the pick-up frame, the tines projecting outwardly between the tine guards for engaging the crop material and urging it upwardly and rearwardly along the outer surfaces of the tine guards, the improvement in the pick-up attachment comprising:

a plurality of generally planar tine guides each having a top end, a generally opposing bottom end, and a rearward-facing edge therebetween, said top end having an upper hook, said bottom end having a lower hook, and said rearward-facing edge having a rear hook; and an upper receptacle on said upper end portion, a lower receptacle on said lower end portion, and a rear receptacle on the pick-up frame, the geometry and relative positioning of said upper, lower, and rear hooks and said upper, lower, and rear receptacles, respectively, being such that at least a portion of each hook engages its respective receptacle to hold each said tine guide in place between said upper and said lower flat portions.

9. The improvement of claim 8, wherein each said plurality of tine guides is positioned to extend generally between the upper and lower ends of a respective tine guard.

10. The improvement of claim 9, wherein said plurality of tine guides may be selectively installed or removed from the pick-up attachment.

11. The improvement of claim 10, wherein said plurality of tine guides are held in place by the engagement of said upper, lower, and rear hooks with said upper, lower, and rear receptacles, respectively without additional fasteners or connectors.

12. The improvement of claim 11, further comprising a deflector mounted adjacent said top end of each tine guide, said deflector having a first angled surface disposed adjacent to a first side of said tine guide and a second angled surface disposed adjacent to an opposing second side of said tine guide, each angled surface being angled relative to said tine guide and contacting respective sides of said tine guides below and spaced apart from said top end.

13. The improvement of claim 12, wherein said deflector further comprises a mount configured to be disposed between and held in position by the pick-up frame and the tine guard.

14. The improvement of claim 13, wherein said deflector comprises two generally symmetric portions, each portion having one of said angled surfaces and a portion of said mount.

* * * * *